United States Patent

[11] 3,612,187

| [72] | Inventor | Price H. Glass<br>Rte. 1 Box 187, Amity, Oreg. 97101 |
| --- | --- | --- |
| [21] | Appl. No. | 32,546 |
| [22] | Filed | Apr. 28, 1970 |
| [45] | Patented | Oct. 12, 1971 |

[54] LAND LEVELER
10 Claims, 6 Drawing Figs.
[52] U.S. Cl. .................................................. 172/780,
172/199, 172/273, 172/393
[51] Int. Cl. ...................................................... E02f 3/64
[50] Field of Search ........................................... 172/4, 4.5,
276, 199, 393, 780, 800–801

[56] References Cited
UNITED STATES PATENTS

| 2,411,277 | 11/1946 | Laird et al. .................... | 172/780 |
| --- | --- | --- | --- |
| 3,103,078 | 9/1963 | Waterson ....................... | 172/4.5 |
| 3,110,973 | 11/1963 | Reynolds....................... | 172/199 |
| 3,506,074 | 4/1970 | Abbott .......................... | 172/780 |
| 3,534,821 | 10/1970 | Mitchell ........................ | 172/780 |

*Primary Examiner*—Robert E. Pulfrey
*Assistant Examiner*—C. W. Hanor
*Attorney*—Kimmel, Crowell & Weaver ABSTRACT: This specification discloses a land leveler comprising a massive rectangular frame including reinforced side bars and three crossbars that engage the ground surface for leveling purposes. These are a tail bar, an intermediate bar and a front bar which is pivotally mounted on the side bars. It may be lowered into position on the ground surface to permit a tractor to be backed thereover into the space between the front and intermediate bars. An inverted U-shaped frame is secured to the front end of the tractor and side legs thereof carry rollers which ride on wear plates upstanding from the side bars.

The section between the intermediate crossbar and tail bar is more extensive than the tractor-receiving section and is provided with diagonal braces. Thus, it is appreciably heavier than the tractor-receiving section. Upstanding from the intermediate crossbar is a bracket which is pivotally connected to the standard drawbar of the tractor hoist. The U frame at the front end of the tractor is provided with stops which cooperate with the wear plates in limiting upward movement of the front end.

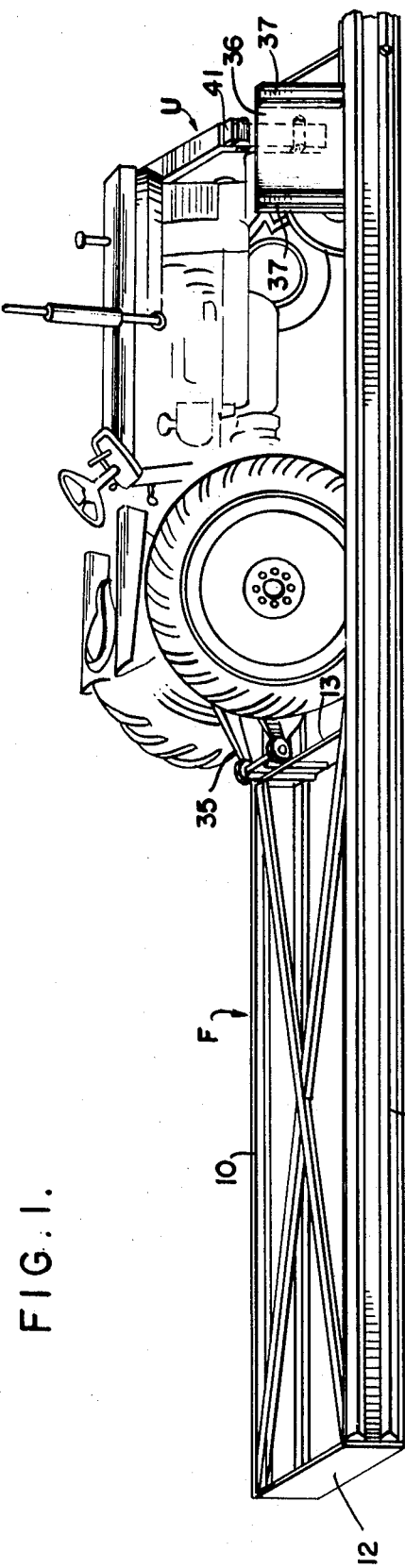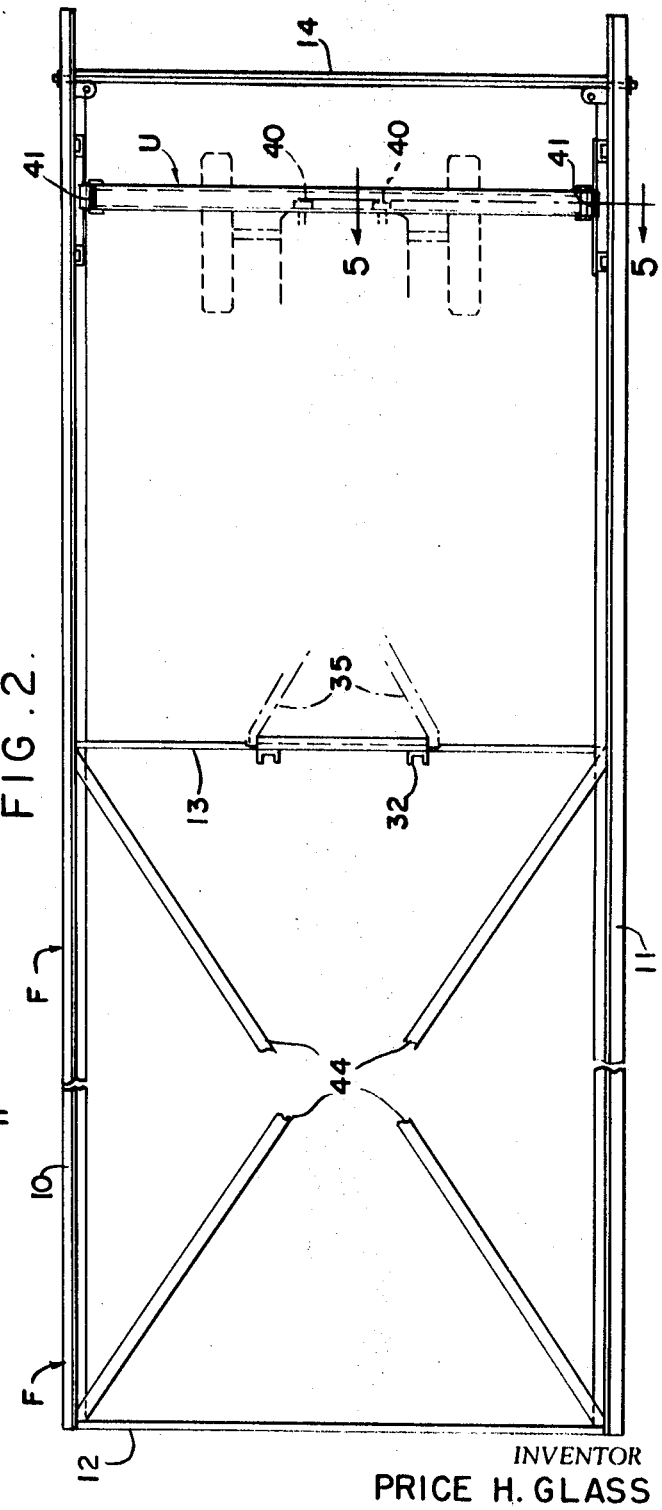

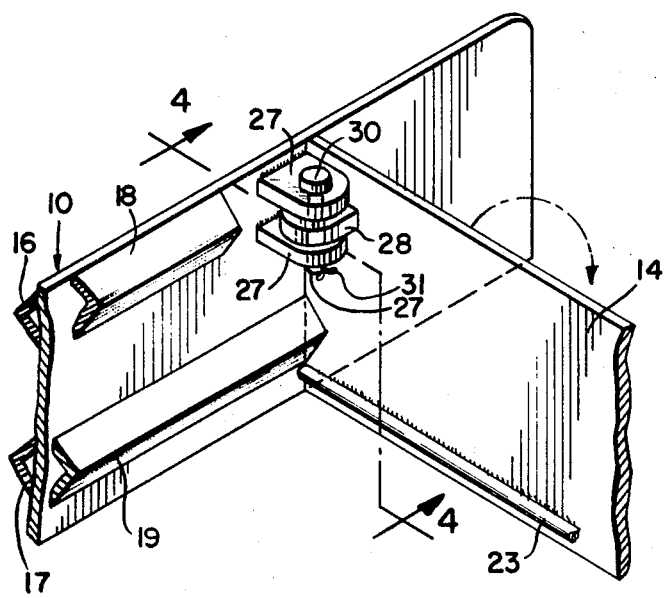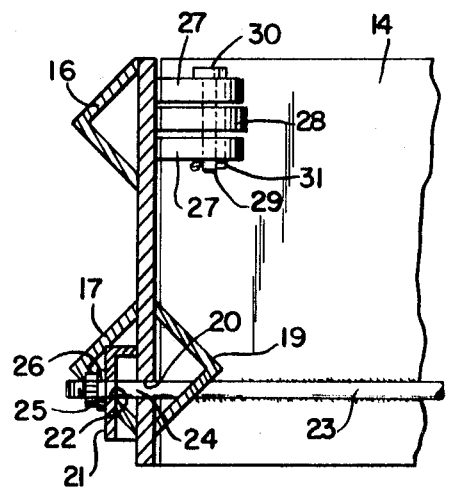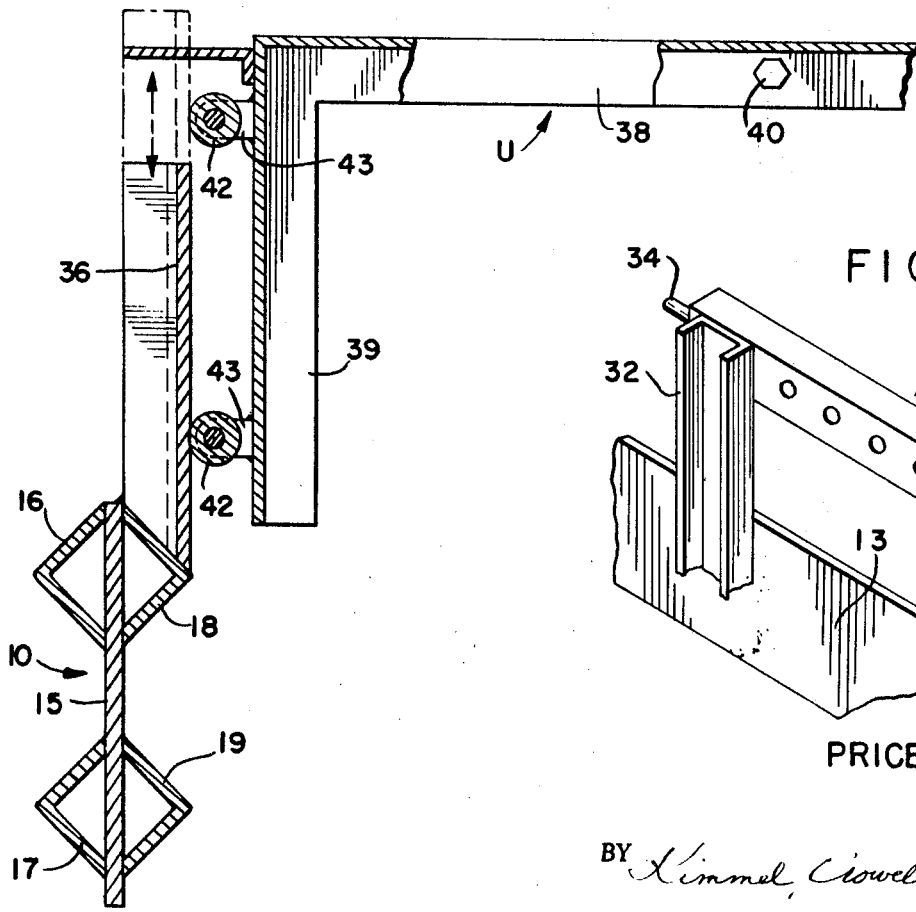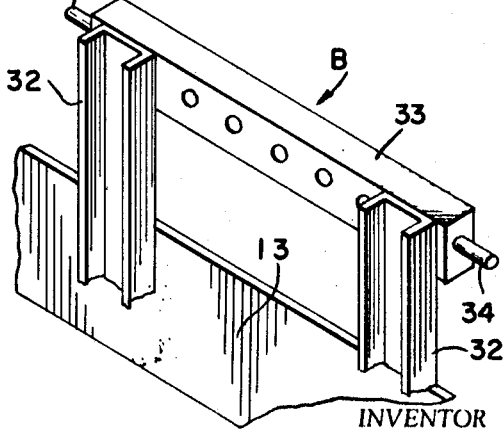

LAND LEVELER

The present invention relates to land levelers and is concerned primarily with a leveler of massive construction which may be assembled on a tractor with a minimum of inconvenience, and when so assembled has a degree of movement relative to the tractor which permits turning of the latter and enhances the leveling operation. It is intended primarily for use in leveling uneven farmland.

BACKGROUND OF THE INVENTION

While the land levelers which are mounted on tractors are now known, the assembly of the now available devices on a tractor is a complex operation. Moreover, when so assembled, they are in a fixed position relative to the tractor and little of any movement between the two is possible. Such movement, particularly on a horizontal axis, is often desirable in leveling bumpy land.

Difficulty has also been encountered in providing a massive frame that is secured to a tractor in that provision for making turns is not properly allowed for by the fixed mounting of the leveler frame on the tractor.

OBJECTS OF THE INVENTION

With foregoing conditions in mind, the invention has in view the following objects:

1. To provide a leveler frame of rectangular shape, including a tail bar, an intermediate crossbar and a front bar which define front and rear sections with the rear section being appreciably heavier than the front section;

2. To provide, in a leveler of the type noted, a front bar which is pivotally mounted at its lower edge between side bars so that it may be swung down into ground-engaging position in which a tractor may be backed thereover;

3. To provide an inverted U-shaped frame that is mounted on the front end of the tractor and which includes legs carrying friction reducing elements which ride on wear plates upstanding from the side bars of the leveler frame;

4. To provide, in a leveler of the character aforesaid, a bracket which is secured to and upstands from the intermediate crossbar. This bracket carries pivot pins which are received in bearing openings in the standard drawbar of the hoist which is included as a part of the tractor. These pivot pins mount the leveler frame on the tractor on a transverse horizontal axis which permits rocking movement of the frame relative to the tractor; and 5. To provide the inverted U frame with stops which cooperate with the wear plates to limit upward movement of the front end of the leveler frame relative to the tractor.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are attained by providing a land leveler comprising a rectangular frame made up of two reinforced side bars, a tail crossbar, a front crossbar that is pivotally mounted at its lower edge between the side bars with a detent for holding the front bar in erect effective position, and an intermediate crossbar that is closer to the front bar than it is the tail bar and which cooperates with the latter bars to define front and rear sections with the rear section being of greater extent than the front section.

An inverted U-shaped frame comprising a toprail and depending legs is secured to the front end of a tractor on which the lever is to be mounted. The toprail is provided with means for establishing this connection. Secured to the legs and outstanding therefrom are a pair of stops which limit upward movement of the front end of the rectangular frame. A wear plate is mounted on each side bar and upstands therefrom in the region of the U frame. The legs of the latter are provided with antifriction devices such as rollers which ride on the wear plates.

A bracket is secured to the intermediate bar and presents a transverse strut spaced above and parallel to this crossbar. The ends of this strut carry pivot pins which are received in bearing openings in the standard drawbar of a hoist that is included in the tractor. Thus, after a tractor is backed over the depressed front bar into position in the front section, the bracket is attached to the hoist drawbar. The hoist is then operated to raise the rectangular frame a required degree. This establishes a rocking or floating relation of the frame to the tractor. The rear section is heavier than the front section and the latter moves upwardly until it engages the stops on the inverted U frame.

For a full and more complete understanding of the invention, reference may be had to the following description and accompanying drawings wherein:

FIG. 1 is a perspective of the land leveler of this invention as mounted on a tractor with the latter being sketchedly depicted;

FIG. 2 is a top plan on an enlarged scale of the leveler with the rear section broken away;

FIG. 3 is a detailed perspective on an enlarged scale of a portion of a side bar and the end of the front bar that is attached thereto;

FIG. 4 is a detailed section through the side bar of FIG. 3, being taken about on the plane represented by the lines 4—4 of FIG. 3;

FIG. 5 is a detailed section on an enlarged scale of one end of the inverted U frame and side bar associated therewith; and FIG. 6 is a detailed perspective of the bracket and a portion of the intermediate crossbar on which it is mounted.

Referring now to the drawings wherein like reference characters denote corresponding parts and first more particularly to FIGS. 1 and 2, the land leveler of this invention is shown as including as a characteristic and essential element a rectangular frame which is identified in its entirety by the reference character F.

Frame F comprises side bars 10 and 11, a tail crossbar 12 which is hereinafter called the tail bar, an intermediate crossbar 13 identified as the middle bar, and a front crossbar 14 which is referred to as the front bar.

Side bars 10 and 11 are of a massive reinforced construction. This structure is more clearly illustrated in FIGS. 3, 4 and 5. As the two side bars 10 and 11 are of substantially identical construction, the details of only one is herein described. Referring to FIGS. 3, 4 and 5, side bar 10 comprises a metallic (iron or steel) plate 15 to the opposite faces of which are welded angle irons 16 and 17, 18 and 19 which constitute reinforcing ribs and will be hereinafter identified as such.

Ribs 16 and 18 are arranged opposite to each other on opposite faces of plate 15 adjacent to the top edge thereof. Rib 16 on the outer face of plate 15 extends throughout the length of the latter. Rib 18 extends from tail bar 12 to a point slightly spaced from front bar 14.

Ribs 17 and 19 are spaced from ribs 16 and 18 being located closely adjacent the bottom edge of plate 15. They are disposed opposite to each other with rib 17 on the outer face of plate 15 being coextensive therewith while rib 18 extends from tail bar 12 to front bar 14 (FIG. 3). It will be understood that ribs 18 and 19 on the inner face of plate 15 are interrupted where the ends of middle bar 13 are welded to the side bars 10 and 11.

Tail bar 12 is welded at each end to side bars 10 and 11 respectively. Middle bar 13 is also welded at each end to the inner faces of side bars 10 and 11 as indicated above.

Formed in the plates 15 of side bars 10 and 11 immediately adjacent to the free ends of ribs 19 are apertures 20, one of which is shown in FIG. 4. Welded to the outer faces of plates 15 at apertures 20 are brackets 21, each having an opening 22 in alignment with an opening 20. Welded to the front bar 14, preferably on its inner face, and closely adjacent to its lower edge is a cylindrical rod 23. Rod 23 is continued out beyond front bar 14 at each end of the latter to provide projecting end portions 24. Each of these end portions 24 is received in a set of aligned openings 21 and 22 (FIG. 4) whereby it is constituted a pivot pin. The terminal part of each end portion 24 is threaded, and screwed thereonto is a nut 25 with a washer 26 being interposed between nut 25 and bracket 21. Thus, front bar 14 is pivotally mounted between side bars 10 and 11 on an axis adjacent to its lower edge.

As shown in FIGS. 3 and 4, a pair of spaced ears 27 are welded to the inner face of plate 15 of side bar 10. A tab 28 is welded to the inner face of front bar 14 and when the latter is in erect or effective position it is received between ears 27. Tab 28 is formed with an aperture as are ears 27. These apertures align and a retaining pin 29 passes through the aligned apertures. Pin 29 has a head 30 and may be maintained assembled with ears 27, tab 28 by a cotter pin 31. Ears 27, tab 28 and pin 29 constitute a detent for holding the front bar 14 in upright effective position.

Under normal conditions one of these detents is sufficient to maintain the front bar 14 erect. While this is considered as the preferred arrangement, another detent may be provided for the other end of front bar 14 on side bar 11 as indicated in FIG. 2.

Referring now to FIG. 6, a bracket is designated generally at B. It comprises a pair of spaced vertical channel bars 32, the lower ends of which are welded to middle bar 13. Spanning the upper ends of channel bars 32 to which it is welded is a transverse horizontal strut 33, the opposite ends of which carry pivot pins 34. The drawbar of a tractor hoist is shown in FIGS. 1 and 2 as including a pair of arms 35. The ends of these arms are formed with bearing openings which receive pins 34 to provide a pivotal connection of bracket B to the tractor.

Referring now to FIGS. 1 and 5, a wear plate 36 is welded to a pair of channel members 37, the lower ends of which are welded to the inner face of plate 15 of each side bar 10 and 11. Channel members 37 are disposed inwardly of front bar 14.

Referring now to FIG. 5, an inverted U-shaped frame is designated generally U. It consists of a toprail 38 of channel construction and depending legs 39 also of channel construction. Toprail 38 and legs 39 are preferably welded to form a one-piece unit. The inner wall of the channel of toprail 38 is formed with a pair of spaced openings which receive screwbolts 40 which anchor the bracket to the front end of a tractor.

Extending outwardly from each leg 39 adjacent to toprail 38 is a stop member 41 which extends over the wear plate 36 on that side to limit upward movement of the front end of frame F which carries the wear plates.

Legs 39 are shown as spaced from wear plates 36 and the outer faces of legs 39 carry antifriction devices such as rollers 42 which are rotatably carried by ears 43 which are welded to legs 39. It is notable that with rollers 42 engaging wear plate 36 on one side, the rollers on the other side are out of engagement with the wear plate on the latter side. Thus, the fit between frame U and the front end of frame F is loose which accommodates turning of the tractor. On some occasions, the rollers will ride on the wear plate at one side and on other occasions on the wear plate on the other side.

Middle bar 13 and front bar 14 cooperate to define a front section of frame F which is the tractor occupying section. Middle bar 13 also cooperates with tail bar 12 to define a rear section of the frame which is of greater extent than is the front section. This rear section is provided with diagonal braces 44 (FIG. 2) which not only add rigidity to the rear section but also increase the weight thereof. Thus, the rear section is appreciably heavier than the front section.

OPERATION

While the manner of using and mode of operation of the subject land leveler are believed to be obvious from the illustrations of the drawings and description of parts, they are briefly outlined as follows:

With the tractor removed from the frame F, pin 30 is withdrawn from the apertures in ears 27 and tab 28. If two detents are included, the pins are withdrawn from both. Blade 14 is now swung forwardly and downwardly as indicated by the arrow of FIG. 3. It now rests on the ground surface. The tractor is then backed over front bar 14 to occupy the front section of frame F. In this position, arms 35 of the tractor hoist are related to pins 34 so that the latter may be fitted in the bearing openings in the arm ends.

The hoist is now operated to raise bracket B. This lifts the frame F at middle bar 13 but, due to the fact that the rear end is heavier than the front end, the latter will rise first and its upward movement continued until wear plates 36 engage stops 41. The operation of the hoist is continued until the frame F, as an entirety, is at a desired height above the ground surface.

It is evident that the frame F assumes a rocking or floating relation with respect to the ground surface. Thus, as the tractor moves it over the ground surface it may rock to accommodate bumps and obstructions. It is possible and often desirable to position the frame F relative to the tractor so that tail bar 12 engages the ground surface, but the engagement will be of a yielding nature due to the pivotal connection at the hoist. In this position, middle bar 13 and front bar 14 will be at increased heights above the ground surface.

The loose relation of inverted U frame U with respect to the wear plates 36 allows for turning of the tractor.

While a preferred specific embodiment of the invention is hereinbefore set forth, it is to be clearly understood that the invention is not to be limited to the exact constructions, mechanisms and devices illustrated and described because various modifications of these details may be provided in putting the invention into practice.

What is claimed is:

1. For use with a tractor having a front end and a hoist at the rear end with the hoist including a drawbar, a land leveler comprising:
   a. a rectangular frame made up of a pair of side bars, a tail bar, a middle bar and a front bar, with the middle bar being closer to the front bar than it is to the tail bar whereby it defines a front section and a rear section; said rear section being heavier than the front section,
   b. a pair of wear plates upstanding from said side bars adjacent to said front bar,
   c. an inverted U frame having a top rail and depending legs, which ride on said wear plates,
   d. means on said top rail for securing it to the front end of a tractor,
   e. stop members outstanding from said legs and engageable with said wear plates to limit upward movement thereof,
   f. a bracket secured to and upstanding from said middle bar,
   g. pivot pins on said bracket adapted to be received in openings in the drawbar of a tractor hoist,
   h. a pivoted connection between said front bar and said side bars, said connection being at the lower edge of said front bar, and
   i. a detent means carried by a side bar for holding said front bar in an erect effective position.

2. The land leveler of claim 1 in which said side bars are reinforced by spaced ribs extending longitudinally thereof.

3. The land leveler of claim 2 in which the ribs take the form of angle irons welded to opposite faces of the side bars.

4. The land leveler of claim 1 in which the U frame is received between the wear plates with a loose fit.

5. The land leveler of claim 4 in which there are antifriction devices between the legs of the U frame and the wear plates.

6. The land leveler of claim 5 in which the antifriction devices comprise rollers carried by said legs.

7. The land leveler of claim 1 in which the pivoted connection between the front bar and side bars consists of pivot pins carried by the front bar and received in openings in the side bars.

8. The land leveler of claim 7 in which the pivot pins are provided by projecting end portions of a rod secured to the front bar adjacent to the lower edge thereof.

9. The land leveler of claim 1 in which the detent means comprises a pair of spaced ears carried by and projecting inwardly from a side bar, a tab on said front bar received between said ears, and a retaining pin passing through aligned apertures in said ears and tab.

10. The land leveler of claim 1 in which the bracket comprises a pair of channel bars welded to and upstanding from said middle bar, a transverse strut welded to the upper ends of said channel bars, and pivot pins projecting from the ends of said strut.